UNITED STATES PATENT OFFICE.

ALEXANDER L. FEILD, OF LAKEWOOD, OHIO, ASSIGNOR TO NATIONAL CARBON COMPANY, INC., A CORPORATION OF NEW YORK.

NON-METALLIC RESISTANCE ELEMENT AND PROCESS OF MAKING SAME.

1,349,053.     Specification of Letters Patent.     Patented Aug. 10, 1920.

No Drawing. Continuation of application Serial No. 266,703, filed December 14, 1918. This application filed June 16, 1919. Serial No. 304,634.

*To all whom it may concern:*

Be it known that I, ALEXANDER L. FEILD, a citizen of the United States, residing at Lakewood, in the county of Cuyahoga and State of Ohio, have invented certain new and useful Improvements in Non-Metallic Resistance Elements and Processes of Making Same, of which the following is a specification.

This invention relates to refractory, non-oxidizing, non-metallic, electric resistance elements and to processes of making the same. The invention will be described by reference to a specific illustrative embodiment thereof, it being understood that the invention is not restricted to the manipulative details hereinafter recited; nor is it restricted to the particular ingredients or proportions of ingredients specified by way of example, inasmuch as these may be varied according to the specific resistance and other properties to be imparted to the product for special uses in the electric arts.

In its preferred embodiment my novel resistance element is produced by the mutual reaction, at high temperatures and in a preformed or shaped body, of titanium or a compound thereof, preferably a compound consisting of or containing titanium in reduced or partially reduced state; a refractory oxid or oxid-mixture, preferably consisting of or containing a material proportion of zirconium oxid; and phosphoric acid; or their equivalents. In addition to these components I may use boric acid or its anhydrid or equivalent materials capable of serving as a flux to promote the proper sintering of the product.

An illustrative embodiment of my invention is as follows:—

I first prepare a mix consisting for example of:—

Titanium carbid _____ 25 parts
    Zirconium oxid _____ 73 "
    Boric anhhydrid _____ 2 "

The above materials, preferably ground to pass a 200 mesh screen, are intimately mixed and compounded with phosphoric acid. The resulting dough should be of proper consistence for extruding in a press or otherwise shaping into a rod or other desired form of element. For example I have found it satisfactory to incorporate with approximately 9 kg. of the above mixture about 900 c. c. of 35% phosphoric acid, the resulting mix being then extruded into rods in a hydraulic press at approximately 1000 lbs. gage pressure. The titanium carbid may be the commercial product known by that name, containing more or less combined nitrogen and the zirconium oxid may be the crude commercial material, or the mineral zirkite, containing usually some 5–15% of other oxids, such as oxids of silicon, aluminum, iron, titanium, etc. The proportion of flux may vary, but it does not usually exceed 8% of the dry mix. The boric anhydrid may be partly or wholly replaced by other suitable fluxes, including such materials as powdered glass, silica, borax, the silicates and phosphates of the alkali or alkali earth metals, etc.

The shaped element is then dried or permitted to set. This setting occurs spontaneously in the course of a few hours, or may be hastened by heating *in vacuo* or otherwise, resulting in a hard, firm body which can be handled without danger of deformation. This setting is probably associated with a chemical reaction between the phosphoric acid and the oxid components of the mixture, possibly with the formation of a zirconium phosphate having cementitious qualities. The elements may then be further dried in an oven at moderate temperatures, say 100°–300° C. to constant weight.

They are then preferably submitted to an intermediate baking operation at a somewhat higher temperature, and under conditions to avoid oxidation. This is conveniently carried out by packing the elements in coke or the like in an iron sagger and heating in an electric muffle furnace. The conditions during this baking are so controlled as to prevent the present or subsequent development of flaws or cracks in the articles, and I now regard it as preferable that they should be baked on a rather slow schedule: For instance I have obtained excellent results by heating the articles in the course of 8–10 hours to about 600° C., and then allowing them to cool sufficiently to permit them to be handled. Obviously this procedure will be modified as may be required in order properly to anneal the articles, and to avoid tendency to the formation of flaws or cracks in the high temperature treatment next described. In some cases this intermediate baking operation may be eliminated as a separate step, or combined with the final or sintering process.

The articles are then submitted to the final operation, comprising heating them out of contact with air or oxidizing conditions, and preferably in a highly reducing atmosphere, to a temperature sufficient to effect sintering, but below the point at which actual fusion or material surface blistering occurs. For a bath of the composition mentioned above I prefer a temperature approximately 1725–1750° C. While my invention is not limited to any specific conditions for performing this operation, I have found it satisfactory to cause the element in rod or other form to progress regularly through a carbon or graphite tube heated in an electric furnace to the temperature specified above, the tubes or the rods being preferably slowly rotated in order to equalize the heating effect. The duration of the heating will of course depend upon the size of the articles. A material contraction or shrinkage of the article occurs during this heating, and it is important that the heat should be evenly applied in order to equalize this contraction and avoid the development of flaws; also the application of heat should be continued until the shrinkage is practically complete. It is within my invention to anneal or otherwise heat-treat the articles in any way in order to insure freedom from flaws.

Resistance elements prepared as above described possess many novel physical and electrical properties, some of which are as follows:

The element is extremely hard, readily scratching glass, is very strong, is apparently free from crystalline structure, is capable of receiving an almost metal-like polish, and gives out a clear, musical note or "ring" when struck. It easily receives an adherent electroplate of copper or other metal, which permits the electrical connections to be readily made. It is for practical purposes non-oxidizable in air: for example elements thus prepared have been maintained at 500° C. in air for fifty hours without impairment by oxidation or otherwise. The apparent density is in the neighborhood of 4.0 to 4.5. The temperature resistance coefficient may for practical purposes be regarded as zero, although in some cases a very small temperature resistance coefficient, positive in sign, and of the order of 0.0–0.0004° per centigrade degree has been observed.

The specific resistance of an element compounded from the particular mix described above is of the order of 0.03 ohms per cubic centimeter, being therefore materially greater than that of the known resistors having a carbon base. Such a resistor in the form of a rod 10.5 centimeters in length and 1.2 centimeters in diameter, radiating in still air at 25° C., is capable of dissipating electrical energy corresponding to 40 watts with the utilization of a current of only 15 amperes, as compared with 600 amperes for nichrome under like conditions. The resistance may, however, be varied within wide limits by varying the proportion of titanium carbid to zirconium oxid in the mix, the resistance increasing with increasing proportions of zirconium oxid. I now prefer that the zirconium oxid or its equivalents should always predominate in the mix over the titanium carbid or its equivalents, the preferred range of titanium carbid being between 5 and 40% by weight of the dry mix. However my invention is not limited to any particular relative proportions of these components.

The chemical composition of the fully sintered resistance elements is not now certainly known, although it has been found to contain titanium and zirconium in substantially the relative proportions in which they were introduced into the mix. During the final heating the phosphoric acid undergoes at least partial reduction, as clearly evidenced by the presence of elemental phosphorus in the furnace vapors, and it is thought that the presence of these vapors or equivalent material having reducing properties is a factor in the production of an element having the optimum texture and physical and electrical properties. It is believed also that the titanium or titanium carbid undergoes at least partial oxidation, or in other words serves as the reducing agent for the phosphoric acid. Thereby any carbon present is at least partially eliminated, the titanium being probably oxidized, wholly or in part to the sesquioxid, $Ti_2O_3$. Without thereby restricting the invention, it is now regarded as probable that the finished article is essentially a solid solution of these highly refractory oxids, possibly in conjuction with non-oxid compounds of the metals present.

I have likewise prepared resistance elements by the use in conjunction with titanium carbid of refractory oxids other than zirconium oxid, and my invention is therefore not restricted to the employment of this particular oxid, which, however, I now regard as the preferred oxid component. For example instead of zirconia I have employed double oxids of the sillimanite type ($Al_2SiO_5$) and of the spinel type ($MgO \cdot Al_2O_3$). Beryl has also been used.

Nor do I desire to restrict my invention to the use of titanium, since it is probable that other metals of the same group may be used in the reduced state, such for example as zirconium or zirconium carbid in conjunction with the refractory oxid of the same or other material, it being known that elements or compunds of the same or closely related groups more readily unite to form solid solutions. Thus thorium oxid or mixtures rich in this oxid may replace zirconium oxid. Hence I desire to cover broadly such materials as may be the equivalents of titanium carbid and zirconium oxid for the specific purposes of this invention.

This application is a continuation of my copending application Serial No. 266,703, filed Dec. 14, 1918.

I claim:—

1. A non-oxidizing, non-metallic electric resistance element having a substantially zero temperature resistance coefficient.

2. An electric resistance element containing a compound of a metal of the titanium-zirconium group, and a refractory oxid, said element having a substantially zero temperature resistance coefficient.

3. An electric resistance element containing oxygen compounds of a plurality of elements of the titanium-zirconium group, said element having a substantially zero temperature resistance coefficient.

4. An electric resistance element containing titanium and zirconium.

5. An electric resistance element containing a reaction product of titanium in reduced state and a refractory oxid.

6. An electric resistance element containing a reaction product of titanium in reduced state and zirconium oxid.

7. An electric resistance element containing a reaction product of titanium in reduced state, zirconium oxid and phosphoric acid.

8. An electric resistance element comprising the product of reaction at a sintering temperature of a shaped mixture containing a plurality of elements of the titanium-zirconium group.

9. An electric resistance element comprising the product of reaction at a sintering temperature of a shaped mixture containing titanium in reduced state and a refractory oxid.

10. An electric resistance element comprising the product of reaction at a sintering temperature of a shaped mixture containing titanium in reduced state and zirconium oxid.

11. An electric resistance element comprising the product of reaction at a sintering temperature of a shaped mixture containing titanium in reduced state, zirconium oxid and phosphoric acid.

12. Process of making an electric resistance element comprising shaping a mixture containing a plurality of elements of the titanium-zirconium group, and sintering the shaped article.

13. Process of making an electric resistance element comprising shaping a mixture containing titanium in reduced state, and a refractory oxid, and sintering the shaped article.

14. Process of making an electric resistance element comprising shaping a mixture containing titanium in reduced state, and zirconium oxid, and sintering the shaped article.

15. Process of making an electric resistance element comprising shaping a mixture containing titanium in reduced state, zirconium oxid, and phosphoric acid, and sintering the shaped article.

16. Process of making an electric resistance element comprising shaping a mixture containing titanium carbid, zirconium oxid and phosphoric acid, and sintering the shaped article.

17. Process of making an electric resistance element comprising shaping a mixture containing titanium carbid, zirconium oxid, phosphoric acid, and a flux, and sintering the shaped article.

18. Process of making an electric resistance element comprising shaping a mixture containing titanium carbid, zirconium oxid, phosphoric acid, and an oxid of boron, and sintering the shaped article.

In testimony whereof, I affix my signature.

ALEXANDER L. FEILD.